3,408,249
ADHERING TEXTILE MATERIALS TO RUBBER
Robert W. Brown, Middlebury, Conn., assignor to Uniroyal Inc., a corporation of New Jersey
No Drawing. Filed Aug. 7, 1964, Ser. No. 388,287
20 Claims. (Cl. 161—88)

This invention relates to improvements in the method of adhering textile materials to rubber, and to the improved laminates so obtained.

In certain rubber articles designed to withstand considerable stresses in use, the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure. In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex "solutioning" composition preferably contains a resin, e.g. a fusible partially reacted resorcinol-formaldehyde resin such as a condensate of resorcinol and formaldehyde in the ratio of 1 mole of resorcinol to about 0.5 to 0.8 mole of formaldehyde, and formaldehyde or a formaldehyde-yielding agent which on subsequent heating as during vulcanization of the rubber intermediate the textile plies cures the fusible resin to an infusible state. According to one aspect of the present invention there is obtained a further improvement in adhesion of the textile material to the rubber intermediate the textile plies in addition to that obtained by the latex "solutioning" treatment of the textile material.

In carrying out the present invention, adhesion of the textile material, which may be bare (so-called grey) or which may be latex "solutioned," to the rubber layers intermediate the textile plies is greatly improved by compounding the solid rubber intermediate the textile plies with trimethylol acetaldehyde and material selected from the group consisting of resorcinol, partially reacted resorcinol-formaldehyde resins (condensed of resorcinol and formaldehyde in the ratio of one mole of resorcinol to about 0.5 to 0.8 mole of formaldehyde), resorcinol-acetaldehyde condensates (condensate of resorcinol and acetaldehyde in the ratio of one mole of resorcinol to about 0.5 to 1 mole of acetaldehyde), and resorcinol-acetone condensates (condensate of resorcinol and acetone in the ratio of one mole of resorcinol to about 0.5 to 2 moles of acetone), which react on heating, as in the vulcanization of rubber to form a resin. Such fusible partially reacted resorcinol-formaldehyde resins and those used in the above-mentioned latex "solutioning" compositions may be prepared in known manner by heating a concentrated aqueous solution of the resorcinol and formaldehyde, with or without a catalyst such as oxalic acid. The resorcinol and acetaldehyde are readily condensed in an easily controlled reaction using an acid such as acetic, oxalic or hydrochloric acid as a catalyst in aqueous or alcoholic medium on standing or by heating at temperatures up to reflux. The condensation products of resorcinol and acetaldehyde, which are tacky amber-like materials, are known. The resorcinol and acetone are readily condensed using dilute hydrochloric acid as a catalyst or standing at room temperature or by heating at temperatures up to reflux. The condensation products of resorcinol and acetone, which are white powders, are known. The trimethylol acetaldehyde is a known compound.

The rubber intermediate the textile plies may be applied in the usual manner by calendering a coating of a solid vulcanizable rubber composition containing the trimethylol acetaldehyde and the resorcinol or partially reacted resorcinol-formaldehyde resin or resorcinol-acetaldehyde condensate or resorcinol-acetone condensate, on the textile, generally on both sides, e.g. as in the conventional coating of tire cord fabric with tire carcass stock. The trimethylol acetaldehyde and the resorcinol or partially reacted resorcinol-formaldehyde resin or resorcinol-acetaldehyde condensate or resorcinol-acetone condensate may be mixed with the conventional compounding ingredients in the solid rubber in a Banbury mixer and the rubber composition then calendered on the textile material. After building the rubber-coated textile material into the finished article, e.g. a tire, the assembly is heated to vulcanize the rubber and react the resin components of the invention. The ratio of the two components of the invention is not critical and generally will be from 0.3 to 3 parts, preferably about one part of the trimethylol acetaldehyde per part, of the resorcinol or partially reacted resorcinol-formaldehyde resin or resorcinol-acetaldehyde condensate or resorcinol-acetone condensate. The amount of these two components mixed with the rubber is not critical. Generally 1 to 10 parts, and preferably 3 to 6 parts, of the two components (total) per 100 parts of the rubber will be mixed in the rubber compound to be calendered on the textile material. Where the textile material is passed through a rubber latex "solutioning" bath and dried, the deposit on the thus treated textile material will be in the range of 2 to 15 percent, preferably 4 to 10 percent, of latex solids based on the weight of the textile material.

The solid rubber used in the present invention for making the rubber and fabric laminates for use in tire manufacture and for other purposes may be natural (Hevea) rubber or conjugated diolefine polymer synthetic rubber or mixtures of any of them including their reclaims. The aqueous dispersion of rubber, when used for "solutioning" the textile material before plying with the solid rubber composition, may be natural rubber latex, or a latex of conjugated diolefine polymer synthetic rubber, or mixtures thereof, or an aqueous dispersion of reclaim from such rubbers, or mixtures of any of such latices and reclaim dispersions. Such conjugated diolefine polymer synthetic rubbers are polymers of butadienes-1,3, e.g. butadiene-1,3, isoprene, 2,3-dimethyl-butadiene-1,3, and copolymers of mixtures thereof, and copolymers of mixtures of one or more such butadienes-1,3, with one or more other polymerizable compounds which are capable of forming rubbery copolymers with butadienes-1,3, for example, up to 60% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefine polymer synthetic rubbers are polybutadiene, polyisoprene, butadiene-styrene copolymers (SBR) and butadiene-acrylonitrile copolymers. The rubber intermediate the plies will also contain conventional compounding and vulcanizing ingredients such as carbon black, rubber processing or softening oils which may be added as such or may be present from oil-extended rubbers, antioxidants, sulfur, zinc oxide and accelerators. The textile material may be any of the conventional textiles used for reinforcing rubber, such as native cellulose (e.g. cottons), regenerated cellulose (e.g. rayons) and synthetic linear polyamides or nylons (e.g. polycaprolactam or nylon 6 and polyhexamethylene-adipamide or nylon 66), and may comprise cords or woven fabrics.

The following examples illustrate the invention. All parts, ratios and percentages referred to herein are by weight. Examples 1 to 4 show the preparation of the trimethylol acetaldehyde, the partially reacted resorcinol-formaldehyde resin, the resorcinol-acetaldehyde condensate and the resorcinol-acetone condensate, respectively, used in Example 5 which shows the use of trimethylol acetaldehyde and resorcinol or partially reacted resorcinol-formaldehyde resin or resorcinol-acetaldehyde condensate or resorcinol-acetone condensate for improving the adhesion of rubber to textile material.

Example 1

Acetaldehyde (40 parts) were mixed with 196 parts of aqueous 37% formaldehyde containing 2 parts of sodium carbonate. The temperature rose to about 50° C. After cooling to 35° C., the reaction mixture was allowed to stand three days. The solution was neutralized with sulfuric acid and evaporated under the vacuum of a water aspirator on a water bath. Acetone (about 200 parts) was added, the sodium sulfate filtered off, and the filtrate again evaporated leaving the trimethylol acetaldehyde as a colorless, viscous residue.

Example 2

Resorcinol (220 parts) were dissolved at 75° C. with stirring in 50 parts of water. Two parts of oxalic acid were added. Fifty parts of aqueous 37% formaldehyde were then run in rapidly whereupon the temperature rose to reflux, at which temperature a further 55 parts of aqueous 37% formaldehyde were added. As soon as all the formaldehyde had been added, there was added 2 parts of sodium hydroxide. The solution was then heated under reduced pressure to evaporate the water, leaving the partially reacted resorcinol-formaldehyde resin as a hard, friable solid.

Example 3

Resorcinol (1000 parts) were dissolved at 50° C. with stirring in 300 parts of water. Ten parts of oxalic acid were added. The resorcinol solution was heated to 50° C. and 240 parts of acetaldehyde were added over a 30–45 minute period. The reaction mixture was stirred for another 20 minutes during which time the temperature dropped to 45° C. There was then added 10 parts of sodium hydroxide. The solution was then heated under reduced pressure to evaporate the water, leaving the resorcinol-acetaldehyde condensate as a tacky amber-like material.

Example 4

Resorcinol (200 parts) were reacted with 106 parts of acetone in the presence of 79 parts of aqueous 32% hydrochloric acid diluted with 174 parts of water by heating for eight hours at 45–50° C. The precipitated product was filtered and washed with water yielding 190 parts of the resorcinol-acetone condensate as a white powder melting at 196–204° C.

Example 5

A rubber compound A was prepared by making 50 parts of SBR (synthetic rubber copolymer of 76.5 parts of butadiene and 23.5 parts of styrene), 50 parts of natural rubber, 30 parts of reclaimed rubber, 40 parts of carbon black, 2 parts of resorcinol, 1 part of octylated diphenylamine (antioxidant), 5 parts of zinc oxide, 1.5 parts of stearic acid, 4 parts of pine tar, 4 parts of light mineral oil, 1.1 parts of N-cyclohexyl-2-benzothiazolesulfenamide (accelerator), 2 parts of the trimethylol acetaldehyde of Example 1, and 3.5 parts of sulfur.

A rubber compound B was prepared in a similar manner to compound A except 2 parts of the partially reacted resorcinol-formaldehyde resin of Example 2 was added instead of the resorcinol.

A rubber compound C was prepared in a similar manner to compound A except 2 parts of the resorcinol-acetaldehyde condensate of Example 3 was added instead of the resorcinol.

A rubber compound D was prepared in a similar manner to compound A except 2 parts of the resorcinol-acetone condensate of Example 4 was added instead of the resorcinol.

A control rubber compound E was prepared in a similar manner to compound A except the resorcinol and trimethylol acetaldehyde were omitted.

The adhesion of rubber compounds A to E to solutioned tire cords made of nylon fibres and of compounds C, D and E to solutioned tire cords made of rayon fibres was measured at 250° F. by the "H" adhesion test described in Ind. Rub. World, 114, 213 (1946) "Study of the 'H' Test for Evaluating the Adhesive Properties of Tire Cord in Natural and GR–S Rubbers." The rayon and nylon cords were passed through conventional latex 'solutioning" baths. The "solutioning" bath used on rayon cords consisted of 80 parts solids of a latex of a copolymer 50 parts of butadiene and 50 parts of styrene, 20 parts solids of a latex of a terpolymer of 70 parts of butadiene, 15 parts of vinyl pyridine and 15 parts of styrene, 8 parts of a partially reacted resorcinol-formaldehyde resin (ratio 1 mole of resorcinol to about 0.6 mole of formaldehyde) 0.5 part of ammonia and 2 parts of formaldehyde, at a 15–20% concentration. The "solutioning" bath used on the nylon cords was similar to the bath used on the rayon cords except 100 parts solids of the latex of the terpolymer of 70 parts of butadiene, 15 parts of vinyl pyridine and 15 parts of styrene was used instead of the 80 parts solids of the latex of the copolymer of 50 parts of butadiene and 50 parts of styrene and the 20 parts solids of the latex of the terpolymer of 70 parts of butadiene, 15 parts of vinyl pyridine and 15 parts of styrene. Following the "solutioning" treatments the cords were dried. In the "H" adhesion test, the cord coated with the selected rubber compound is embedded in two separate standard rubber blocks and the assembly vulcanized. The pounds necessary to pull the adhered cord free of one of the rubber blocks is the "H" adhesion value. The higher the value, the better the adhesion of the rubber coating to the cord. Test pieces for the rubber compounds A to E were vulcanized for 45 minutes at 293° F. The results are shown in the following table:

| Cord | 250° F. "H" Adhesion (lbs.) | | | | |
|---|---|---|---|---|---|
| | A | B | C | D | E |
| Nylon | 15.1 | 13.7 | 14.0 | 14.4 | 11.2 |
| Rayon | | | 13.1 | 15.9 | 12.1 |

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of laminating textile material and rubber by applying a solid vulcanizable rubber composition to a textile material and heating the assembly to vulcanize the rubber, the step which comprises incorporating in the rubber before vulcanization trimethylol acetaldehyde and material selected from the group consisting of resorcinol, partially reacted resorcinol-formaldehyde resins, condensation products of resorcinol and acetone, and condensation products of resorcinol and acetaldehyde.

2. In the method of laminating textile material and rubber by applying a solid vulcanizable rubber composition to a textile material containing the dried deposit of a rubber latex treating bath and heating the assembly to vulcanize the rubber, the step which comprises incorporating in the rubber before vulcanization trimethylol acetaldehyde and material selected from the group consisting of resorcinol, partially reacted resorcinol-formaldehyde resins, condensation products of resorcinol and acetone, and condensation products of resorcinol and acetaldehyde.

3. In the method of laminating textile material and rubber by applying a solid vulcanizable rubber composition to a textile material and heating the assembly to vulcanize the rubber, the step which comprises incorporating in the rubber before vulcanization trimethylol acetaldehyde and a partially reacted resorcinol formaldehyde resin.

4. In the method of laminating textile material and rubber by applying a solid vulcanizable rubber composition to a textile material and heating the assembly to vulcanize the rubber, the step which comprises incorporating in the rubber before vulcanization of trimethylol acetaldehyde and a condensation product of resorcinol and acetone.

5. A method of adhering textile material to rubber which comprises applying a solid vulcanizable rubber composition comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with compounds which contain a $CH_2=C<$ group and which are copolymerizable with butadienes-1,3, said rubber composition containing trimethylol acetaldehyde and material selected from the group consisting of resorcinol, partially reacted resorcinol-formaldehyde resins, condensation products of resorcinol and acetone, and condensation products of resorcinol and acetaldehyde, to a textile material selected from the group consisting of cotton, rayon and nylon to coat the same, and heating the assembly to vulcanize the rubber and to firmly adhere the textile material to the vulcanized rubber composition.

6. A method of adhering textile material to rubber which comprises passing the textile material through a bath of an aqueous dispersion of rubber and drying, applying a solid vulcanizable rubber composition to the thus treated textile material, the rubber in said aqueous dispersion and in said solid rubber composition being selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with compounds which contain a $CH_2=C<$ group and which are copolymerizable with butadienes-1,3, said rubber composition containing trimethylol acetaldehyde and material selected from the group consisting of resorcinol, partially reacted resorcinol-formaldehyde resins, condensation products of resorcinol and acetone, and condensation products of resorcinol and acetaldehyde, to a textile material selected from the group consisting of cotton, rayon and nylon to coat the same, and heating the assembly to vulcanize the rubber and to firmly adhere the textile material to the vulcanized rubber composition.

7. A method of adhering tire cord fabric to a tire carcass stock which comprises calendering on tire cord containing the dried deposit of a rubber latex treating bath a vulcanizable rubber tire carcass stock containing trimethylol acetaldehyde and material selected from the group consisting of resorcinol, partially reacted resorcinol-formaldehyde resins, condensation products of resorcinol and acetone, and condensation products of resorcinol and acetaldehyde, and subsequently heating to vulcanize the rubber and to firmly adhere the tire cord fabric to the vulcanized tire carcass stock.

8. A method of adhering tire cord fabric to a tire carcass stock which comprises calendering on tire cord fabric containing the dried deposit of a rubber latex treating bath a vulcanizable tire carcass stock containing trimethylol acetaldehyde and a partially reacted resorcinol-formaldehyde resin, and subsequently heating to vulcanize the rubber and to firmly adhere the tire cord fabric to the vulcanized tire carcass stock.

9. A method of adhering tire cord fabric to a tire carcass stock which comprises calendering on tire cord fabric containing the dried deposit of a rubber latex treating bath a vulcanizable tire carcass stock containing trimethylol acetaldehyde and a condensation product of resorcinol and acetone, and subsequently heating to vulcanize the rubber and to firmly adhere the tire cord fabric to the vulcanized tire carcass stock.

10. A laminate of textile material and a calendered vulcanized rubber composition containing the reaction product of trimethylol acetaldehyde and material selected from the group consisting of resorcinol, partially reacted resorcinol-formaldehyde resins, condensation products of resorcinol and acetone, and condensation products of resorcinol and acetaldehyde.

11. A laminate of textile material and a calendered vulcanized rubber composition containing the reaction product of trimethylol acetaldehyde and a partially reacted resorcinol-formaldehyde resin.

12. A laminate of textile material and a calendered vulcanized rubber composition containing the reaction product of trimethylol acetaldehyde and a condensation product of resorcinol and acetone.

13. A laminate of tire cord fabric and a vulcanized rubber tire carcass stock containing the reaction product of trimethylol acetaldehyde and material selected from the group consisting of resorcinol, partially reacted resorcinol-formaldehyde resins, condensation products of resorcinol and acetone, and condensation products of resorcinol and acetaldehyde.

14. A laminate of tire cord fabric and a vulcanized rubber tire carcass stock containing the reaction product of trimethylol acetaldehyde and a partially reacted resorcinol-resin.

15. A laminate of tire cord fabric containing the dried deposit of a rubber latex treating bath, and a vulcanized rubber tire carcass stock containing the reaction product of trimethylol acetaldehyde and material selected from the group consisting of resorcinol, partially reacted resorcinol-formaldehyde resins, condensation products of resorcinol and acetone, and condensation products of resorcinol and acetaldehyde.

16. A laminate of tire cord fabric containing the dried deposit of a rubber latex treating bath, and a vulcanized rubber tire carcass stock containing the reaction product of trimethylol acetaldehyde and a partially reacted resorcinol-formaldehyde resin.

17. A laminate of tire cord fabric containing the dried deposit of a rubber latex treating bath, and a vulcanized rubber tire carcass stock containing the reaction product of trimethylol acetaldehyde and a condensation product of resorcinol and acetone.

18. A solid vulcanizable rubber composition containing trimethylol acetaldehyde and material selected from the group consisting of resorcinol, partially reacted resorcinol-formaldehyde resins, condensation products of resorcinol and acetone, and condensation products of resorcinol and acetaldehyde.

19. A solid vulcanizable rubber composition comprising trimethylol acetaldehyde and a partially reacted resorcinol-formaldehyde resin.

20. A solid vulcanizable rubber composition comprising trimethylol acetaldehyde and a condensation product of resorcinol and acetone.

References Cited

UNITED STATES PATENTS

| | | | |
|---|---|---|---|
| 1,878,040 | 9/1932 | Voss | 156—110 |
| 2,746,898 | 5/1956 | Buckwalter et al. | 156—110 |
| 2,902,470 | 9/1959 | Kress | 161—241 X |
| 3,194,294 | 7/1965 | Van Gils | 161—241 X |

OTHER REFERENCES

Wertheim, E.: "Textbook of Organic Chemistry," 3rd ed., McGraw-Hill Book Co., 1951, pp. 170 and 172.

Bennett, H.: "Concise and Technical Dictionary," 1947, Chemical Publishing Co., Inc., New York City, p. 736.

EARL M. BERGERT, *Primary Examiner.*

CLIFTON B. COSBY, *Examiner.*